US012669097B2

(12) United States Patent
Sonnek

(10) Patent No.: US 12,669,097 B2
(45) Date of Patent: *Jun. 30, 2026

(54) METHOD AND SYSTEM FOR CONTROLLING DIESEL ENGINE EMISSIONS BY FUEL BLENDING

(71) Applicant: Clear Torque LLC, Lake Crystal, MN (US)

(72) Inventor: Daniel W. Sonnek, Lake Crystal, MN (US)

(73) Assignee: Clear Torque LLC, Lake Crystal, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/983,652

(22) Filed: Dec. 17, 2024

(65) Prior Publication Data

US 2025/0389234 A1 Dec. 25, 2025

Related U.S. Application Data

(63) Continuation of application No. 18/753,500, filed on Jun. 25, 2024, now Pat. No. 12,215,647.

(51) Int. Cl.
*F02D 41/30* (2006.01)
*F02D 41/14* (2006.01)

(52) U.S. Cl.
CPC ......... *F02D 41/30* (2013.01); *F02D 41/1439* (2013.01); *F02D 2250/36* (2013.01)

(58) Field of Classification Search
CPC ............. F02D 41/0025; F02D 41/3094; F02D 19/0628; F02D 19/0655; F02D 19/0602; F02D 19/026; F02D 19/0665; F02D 2200/0611; F02D 2250/36; F02M 37/0064; F02M 37/0088; F02M 35/10216; Y02T 10/30
See application file for complete search history.

(56) References Cited

U.S. PATENT DOCUMENTS

| | | | | |
|---|---|---|---|---|
| 7,159,568 | B1 | 1/2007 | Lewis et al. | |
| 8,826,888 | B1 | 9/2014 | Kenney et al. | |
| 11,098,663 | B2 | 8/2021 | Sonnek et al. | |
| 2004/0084023 | A1* | 5/2004 | Koegler ................. | F02M 43/04 239/398 |
| 2007/0119413 | A1 | 5/2007 | Lewis et al. | |
| 2008/0041335 | A1 | 2/2008 | Buchwitz et al. | |
| 2009/0215139 | A1 | 8/2009 | Datta et al. | |
| 2010/0030451 | A1 | 2/2010 | Lippa et al. | |
| 2011/0048353 | A1 | 3/2011 | Livshits et al. | |
| 2012/0103306 | A1 | 5/2012 | Livshits et al. | |
| 2014/0076291 | A1 | 3/2014 | Wong | |

(Continued)

*Primary Examiner* — Hai H Huynh
*Assistant Examiner* — Johnny H Hoang
(74) *Attorney, Agent, or Firm* — Fox Rothschild LLP

(57) ABSTRACT

A system and method for controlling diesel engine emissions include blending diesel with ethanol to provide reduced NOx emissions generated from a combustion reaction in an internal combustion engine. The system and method incorporate a feedback system that monitors the NOx levels in the exhaust system and adjusts the flow of ethanol and fuel automatically, thereby maintaining the overall efficiency and performance of the engine system while reducing operation costs and significantly lowering the NOx emissions generated from the combustion of the fuel blend in the engine.

12 Claims, 6 Drawing Sheets

(56) References Cited

U.S. PATENT DOCUMENTS

| | | | |
|---|---|---|---|
| 2014/0373804 | A1 | 12/2014 | Livshits et al. |
| 2015/0330290 | A1 | 11/2015 | Glugla et al. |
| 2016/0169143 | A1 * | 6/2016 | Monros .................. F01M 13/04 123/525 |
| 2017/0145970 | A1 | 5/2017 | Gonzalez Salazar et al. |
| 2018/0171890 | A1 * | 6/2018 | Kamei .................. F02D 19/081 |
| 2020/0248653 | A1 | 8/2020 | Voss |

* cited by examiner

METHOD AND SYSTEM FOR CONTROLLING DIESEL ENGINE EMISSIONS BY FUEL BLENDING

CROSS-REFERENCE TO RELATED APPLICATIONS

This application is a continuation of U.S. patent application Ser. No. 18/753,500 filed Jun. 25, 2024, the disclosure of which is hereby incorporated herein by reference in its entirety.

FIELD

The present disclosure relates to a method and system for reducing the generation of harmful NOx in a diesel engine without sacrificing engine efficiency or engine performance.

BACKGROUND

Power generation machines such as internal combustion engines use a fuel source that undergoes a combustion reaction that produces greenhouse gases, notably nitrogen oxide (NOx) that are harmful to the environment. Among internal combustion engines, diesel engines tend to generate a greater amount of NOx compared to conventional gasoline engines due to the use of diesel fuel, which is unrefined compared to gasoline-based fuels. Therefore, while diesel engines provide better fuel economy and lower operating costs compared to gasoline engines, they are being phased out or highly regulated in various government jurisdictions, including various countries in Europe, Asia, and multiple states in the United States, due to excessive generation of NOx and damage to the environment.

In order to reduce the NOx emission released from diesel engines, additional equipment, such as an exhaust treatment system or water injection system, are used to treat some of the NOx in the emission gas in the exhaust before they are released into the atmosphere. However, these systems have drawbacks such as requiring complex modification to the engine system, leading to lower compatibility with different diesel engines and vehicles, reduced engine efficiency, and shortened engine life. For instance, a high degree of moisture and humidity in a water injection system result in an accelerated corrosion of metallic engine components, leading to a higher risk of engine failure and shortened engine life. Furthermore, current state-of-the-art systems are related to treating the already generated NOx emissions rather than lowering the amount of NOx gas generated.

Given the foregoing, there is a need for a system that reduces the amount of NOx generated in the diesel engine without requiring a complex modification to the pre-existing engine system or sacrificing engine's performance and reliability.

SUMMARY

In one aspect, the disclosed technology relates to a system for controlling NOx production in an engine, the system comprising: a first control module configured to route diesel into the engine; and a second control module configured to route ethanol into the engine; wherein the ethanol has a concentration in a range from about 140 proof to about 190 proof; and wherein the ethanol is blended with the diesel prior to a combustion reaction in the engine. In some embodiments, the ethanol is present in a range from about 5% to about 85% of a blend of the ethanol and the diesel. In some embodiments, the system further comprises an exhaust system configured to receive exhaust gas produced from the combustion reaction, wherein the exhaust system comprises a NOx sensor inlet, a NOx sensor outlet, a diesel exhaust fluid (DEF) pump; wherein the DEF pump is configured to provide vaporized DEF stream to the exhaust gas; wherein the vaporized DEF stream is located between the NOx sensor inlet and the NOx sensor outlet; and wherein the exhaust system receives the exhaust gas from the engine and routes the exhaust gas through the NOx sensor inlet, the vaporized DEF stream, and the NOx sensor outlet.

In some embodiments, the NOx sensor inlet is configured to measure NOx level in the exhaust gas prior to exposure to the vaporized DEF stream; and wherein the NOx sensor outlet is configured to measure the NOx level in the exhaust gas after the exposure to the vaporized DEF stream. In some embodiments, the NOx sensor inlet and the NOx sensor outlet communicate with the first control module to modulate flow of the vaporized DEF stream. In some embodiments, the NOx sensor inlet and the NOx sensor outlet communicate with the first control module to modulate flow of the diesel into the engine. In some embodiments, the flow of the diesel is decreased at a NOx level above a threshold NOx level and increased at a NOx level below the threshold NOx level. In some embodiments, the flow of the vaporized DEF stream is increased at a NOx level above a threshold NOx level and decreased at a NOx level below the threshold NOx level.

In some embodiments, the first control module is coupled to the second control module. In some embodiments, the first control module sends data received from NOx sensor inlet and NOx sensor outlet to the second control module to adjust flow of the ethanol into the engine. In some embodiments, the flow of the ethanol is increased at a NOx level above a threshold NOx level and decreased at a NOx level below the threshold NOx level. In some embodiments, when the ethanol is not available, the second control module sends data to the first control module to adjust diesel flow to the engine and vaporized DEF stream flow to exhaust system.

In another aspect, the disclosed technology relates to a vehicle comprising: an engine configured for combustion of diesel; and a system for controlling NOx production in the engine, the system comprising: a first control module configured to route the diesel into the engine; and a second control module configured to route ethanol into the engine; wherein the ethanol has a concentration in a range from about 140 proof to about 190 proof; wherein the ethanol is blended with the diesel prior to combustion reaction in the engine; and wherein the ethanol is present in a range from about 5% to about 85% of total ethanol and diesel blend.

In another aspect the disclosed technology relates to a method of controlling NOx production in an engine, the method comprising: routing oxygen and nitrogen containing gas to an engine cylinder; blending ethanol and diesel prior to routing to the engine; and combining ethanol and diesel blend with the oxygen and nitrogen containing gas in the engine cylinder to activate a combustion reaction producing exhaust gas comprising nitrogen oxide (NOx); wherein the ethanol has a concentration in a range from about 140 proof to about 190 proof, and wherein the ethanol and the diesel are stored in separate storage tanks prior to blending of the ethanol and the diesel. In some embodiments, the method further comprises; routing the exhaust gas to an exhaust system to convert NOx in the exhaust gas to $N_2$ and $H_2O$ by selective catalytic reduction (SCR) using vaporized DEF stream; monitoring NOx level data in the exhaust system; routing the NOx level data in the exhaust system to a first control module to modulate flow of vaporized DEF stream flow into the exhaust system; and routing the NOx level data in the exhaust system to the first control module to modulate flow of the diesel to the engine. In some embodiments, the method further comprises sending the NOx level data in the exhaust system from the first control module to a second control module to modulate flow of ethanol into the engine.

In some embodiments, the flow of ethanol is increased at a NOx level above a threshold NOx level and decreased at a NOx level below the threshold NOx level in the exhaust system. In some embodiments, the flow of vaporized DEF stream is increased at a NOx level above a threshold NOx level and decreased at a NOx level below the threshold NOx level in the exhaust system. In some embodiments, the flow of diesel is decreased at a NOx level above a threshold NOx level and increased at a NOx level below the threshold NOx level in the exhaust system. In some embodiments, the ethanol is present in a range from about 5% to about 85% of the ethanol and diesel blend.

DETAILED DESCRIPTION

Figure 1:
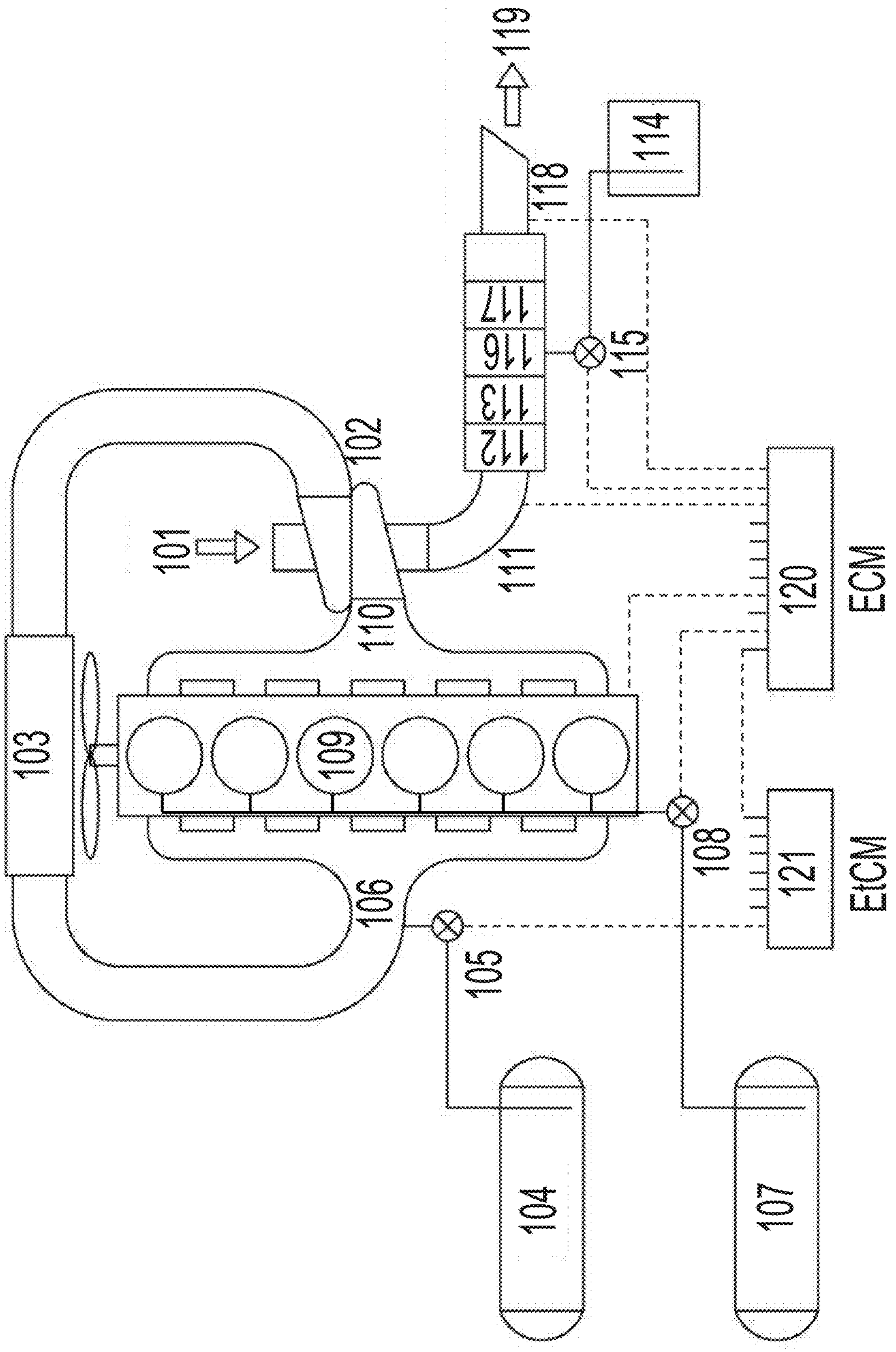
FIG. 1 is a schematic of an engine system for controlling diesel engine emissions, according to the present disclosure.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to make and use the disclosed technology, in combination with routine experiments, to achieve other outcomes not specifically disclosed in the examples or the embodiments.

Unless otherwise specifically defined herein, all terms are to be given their broadest possible interpretation, including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

As used herein, "about" when used in connection with a numeric value, is intended to include values that are close to, but not exactly, the number to the nearest significant figure. For example, a numerical value of "about 5" may include values ranging from 4.6 to 5.4.

As used herein, all % are % by volume, i.e., % v/v, unless indicated otherwise.

As used herein, various terms are used, such as "first," "second," and the like. These terms are words of convenience in order to distinguish between different elements, and such terms are not intended to be limiting as to how the different elements may be utilized.

The system disclosed herein blends diesel fuel with low-proof ethanol prior to combusting in the engine which can accomplish up to an 80% reduction in nitrogen oxide (NOx) generated compared to a conventional diesel system. As the blending system is coupled to an ethanol control module (EtCM) and receives feedback data and signals from an engine control module (ECM), the ethanol flow can be controlled based on NOx emissions, engine loading, engine temperature, and engine pressure. Further, no modification to the current, onboard ECM is required since any variation caused by the ethanol fuel will automatically cause adjustments in the ECM. These adjustments will reduce diesel flow to the engine and limit or eliminate the diesel exhaust fluid (DEF) flow to the exhaust system and the selective catalytic reduction (SCR). Therefore, if low-proof ethanol is not available, the ECM will adjust the diesel flow to the engine and the DEF stream flow to the exhaust SCR.

As used herein, the term "NOx" or "nitrogen oxide" refers to a family of poisonous, highly reactive gases formed when fuel is burned at high temperatures. The NOx used in this document include, but is not limited to nitric oxide (NO) and nitrogen dioxide ($NO_2$) but may also include nitrous oxide ($N_2O$), dinitrogen dioxide ($N_2O_2$), dinitrogen tetroxide ($N_2O_4$), dinitrogen trioxide, ($N_2O_3$), dinitrogen pentoxide ($N_2O_5$), nitrous acid (HONO), peroxynitric acid ($HNO_4$), nitric acid ($HNO_3$), and nitrous acid ($HNO_2$).

As used herein, the term "exhaust gas" or "emission gas" refers to a mixture of gases and particulate matter that are expelled from the engine after undergoing the combustion process. As used herein, the "exhaust gas" or "emission gas" includes various gaseous components, including but not limited to NOx, carbon monoxide (CO), carbon dioxide ($CO_2$), and hydrocarbons. As used herein, the particulate matters include tiny solid or liquid particles suspended in the exhaust gas, comprising carbon particles, sulfur-based particles (e.g., sulfates), traces of metallic ash, soot, and unburned or partially burned hydrocarbons.

In a conventional diesel engine, diesel is directly injected into the engine cylinders, where it reacts with compressed air to drive a combustion reaction, converting the chemical energy, e.g., diesel fuel, into mechanical energy as applying work to a drive system in a vehicle. The temperature and pressure to achieve a suitable combustion reaction in a conventional diesel engine are between about 1,000° C. and about 1,800° C. and about 1,000 psi and about 3,000 psi, respectively. The combustion of diesel, which is primarily composed of hydrocarbons, produces exhaust gas that includes various small particulates and gaseous pollutants, including nitrogen oxide (NOx) and carbon monoxide (CO). In a conventional system, NOx is typically produced at a high temperature, generally above 1,200° C. The exhaust gas is then routed to the exhaust system to remove the particulates and ultimately convert NOx to inert nitrogen gas ($N_2$) and water ($H_2O$), which are released into the environment.

In order to reduce some of the NOx in the released exhaust gas, the engine exhaust system typically includes a diesel oxidizing catalyst (DOC), where the exhaust gas is partially converted to carbon dioxide ($CO_2$) and water ($H_2O$). The remaining unconverted exhaust gas is then routed to a diesel particulate filter (DPF), where particulates are separated from the exhaust gas. As the exhaust gas is routed through the exhaust system, diesel exhaust fluid (DEF), which consists of urea and water, is vaporized in the DEF exhaust stream, producing ammonia ($NH_3$) and $CO_2$. The exhaust gas is then exposed to the vaporized DEF stream, where $NH_3$ reacts with NOx in the exhaust gas in the presence of a catalyst to drive a selective catalytic reduction (SCR) to produce inert nitrogen ($N_2$) and $H_2O$, which is safely released to the environment. The SCR is activated by metal-based catalysts known in the art, such as titanium, vanadium, tungsten, platinum, palladium, rhodium, or combinations thereof.

In a conventional diesel engine system, an onboard engine control module (ECM) controls the starting, stopping, and quantity of vaporized DEF stream to be injected into the exhaust gas to convert some NOx in the exhaust gas to inert $N_2$ and $H_2O$ . . . . For instance, when the combustion reaction results in the generation of a large amount of NOx in the exhaust gas, the ECM sends a signal to the DEF pump to inject a greater amount of vaporized DEF stream into the exhaust system. Conversely, when the NOx level in the exhaust gas is low, the ECM sends a signal to the DEF pump to inject a lesser amount of vaporized DEF stream into the exhaust system. While this system is capable of treating NOx in the generated exhaust gas for safe discharge, it is only limited to post-combustion processes and fails to reduce the amount of NOx generated from the initial combustion of the fuel in the engine.

The present method addresses this limitation by injecting ethanol from the engine header into the engine cylinder and blending it with injected diesel prior to the combustion, which reduces the production of NOx by up to 80%. By essentially replacing some of the diesel with low-proof ethanol, NOx production from the combustion of the diesel component of the fuel blend is reduced, while engine efficiency and engine performance are sustained. However, as ethanol cannot be blended with diesel in a single tank prior to blending in the engine cylinder due to the phase separation of the two fuel components and different injection requirements, separate tanks are used to store and route each fuel component before they are blended in the engine cylinder. In this configuration, the injection rate of the ethanol component and the diesel component may be modulated independently. In various embodiments, lower proof ethanol, having ethanol concentration in a range from 140 to 190 proof (70% to 95% ethanol) supplies a suitable amount of water to be injected into the diesel engine while preventing freezing of the liquid when operating the engine in cold temperatures near or below the freezing temperature of the water, i.e., 0° C.

The presence of water in the ethanol further improves the efficiency of the diesel engine by reducing the temperature of the combustion reaction, which limits the formation of NOx, which is typically produced at higher temperatures and provides additional oxygen sources to drive the combustion reaction maintaining the engine efficiency and power output. Accordingly, the lower the ethanol proof (i.e., higher water content), the more effective NOx reduction is achieved. Thus, by injecting the low-proof ethanol separately from the diesel into the engine, overall NOx emission reduction is achieved.

In various embodiments, the starting, stopping, and amount of ethanol to be blended with the diesel is controlled by an ethanol control module (EtCM), which receives feedback signals from the ECM. Accordingly, the EtCM can match or bias the fuel flows based on the NOx emission, engine loading, engine temperature, and engine pressure. Additionally, no modification to the current ECM is required since any variation caused by the ethanol fuel will automatically cause adjustments in the ECM, providing a feedback system that can work cooperatively or independently. These adjustments will reduce diesel flow to the engine and limit or eliminate the diesel exhaust fluid (DEF) flow to the exhaust system. Therefore, if no low-proof ethanol is available, the ECM will adjust the diesel flow to the engine and the DEF stream flow to the exhaust gas.

Referring now to FIG. 1, a system for reducing NOx production in a diesel engine is shown. Oxygen and nitrogen containing gas 101 is routed through turbocharger 102, where it is compressed, reducing the volume and increasing the gas temperature. Now warm and compressed gas is then routed to air cooler 103 to lower the gas temperature before being routed to engine inlet header 106 and into engine cylinders 109. In a separate path, low-proof ethanol from ethanol tank 104 is routed to the engine inlet header 106 by ethanol pump 105 while diesel, which is stored in diesel tank 107, is atomized and injected into engine cylinders 109 by diesel pump 108.

The ethanol that is in the engine inlet header 106 is atomized and injected into engine cylinders 109 where it is blended with atomized diesel and combusted in the presence of compressed air. After combustion, the generated exhaust gas comprising NOx exits the engine cylinders 109 at exhaust header 110 and is routed through an exhaust system comprising a diesel oxidation catalyst 112, diesel particulate filter 113, and selective catalytic reduction 117. The NOx level in the exhaust gas is monitored at NOx sensor inlet 111, which sends data to an engine control module 120. Based on the level of NOx present in the exhaust gas, engine control module 120 adjusts the flow of diesel exhaust fluid from DEF tank 114 by DEF pump 115, where it is vaporized into diesel exhaust fluid stream 116 that reacts with the exhaust gas to drive selective catalytic reduction 117. After selective catalytic reduction 117, the treated exhaust gas, now converted to environmentally acceptable $N_2$ and $H_2O$, is released at engine exhaust 119. In various embodiments, some of the exhaust gas may be recirculated into the engine's cylinder to replace a certain percentage of compressed air to further reduce the level of NOx, i.e., engine gas recirculation.

In various embodiments, after selective catalytic reduction 117, the NOx level is monitored at NOx sensor outlet 118, which sends the NOx level to engine control module 120. Engine control module 120 is coupled to diesel pump 108 and controls the diesel flow into the engine inlet header 106 depending on the level of NOx detected at the NOx sensor inlet and the NOx sensor outlet. In some embodiments, engine control module 120 also sends signals to ethanol control module 121, which controls the flow of ethanol from ethanol tank 104 to engine inlet header 106, where it is blended with diesel. Thus, the present system is configured to provide feedback between the post-combustion system, i.e., the exhaust system, and the pre-combustion system, i.e., the fuel blending system, based on the amount of NOx emission generated in the engine. This feedback system reduces the overall diesel flow to the engine, thereby generating less NOx through combustion, and further limits or eliminates post-combustion processing of the exhaust gas by the diesel exhaust fluid in the downstream exhaust system. Further, as the second control module, e.g., EtCM, can be readily installed to the pre-existing diesel engine vehicles or power generation systems by simply coupling to the first control module, no complicated modifications to the pre-existing engine components or the vehicle are required extending the life of the current diesel-powered vehicles as well as other diesel-powered machines.

Figure 2:
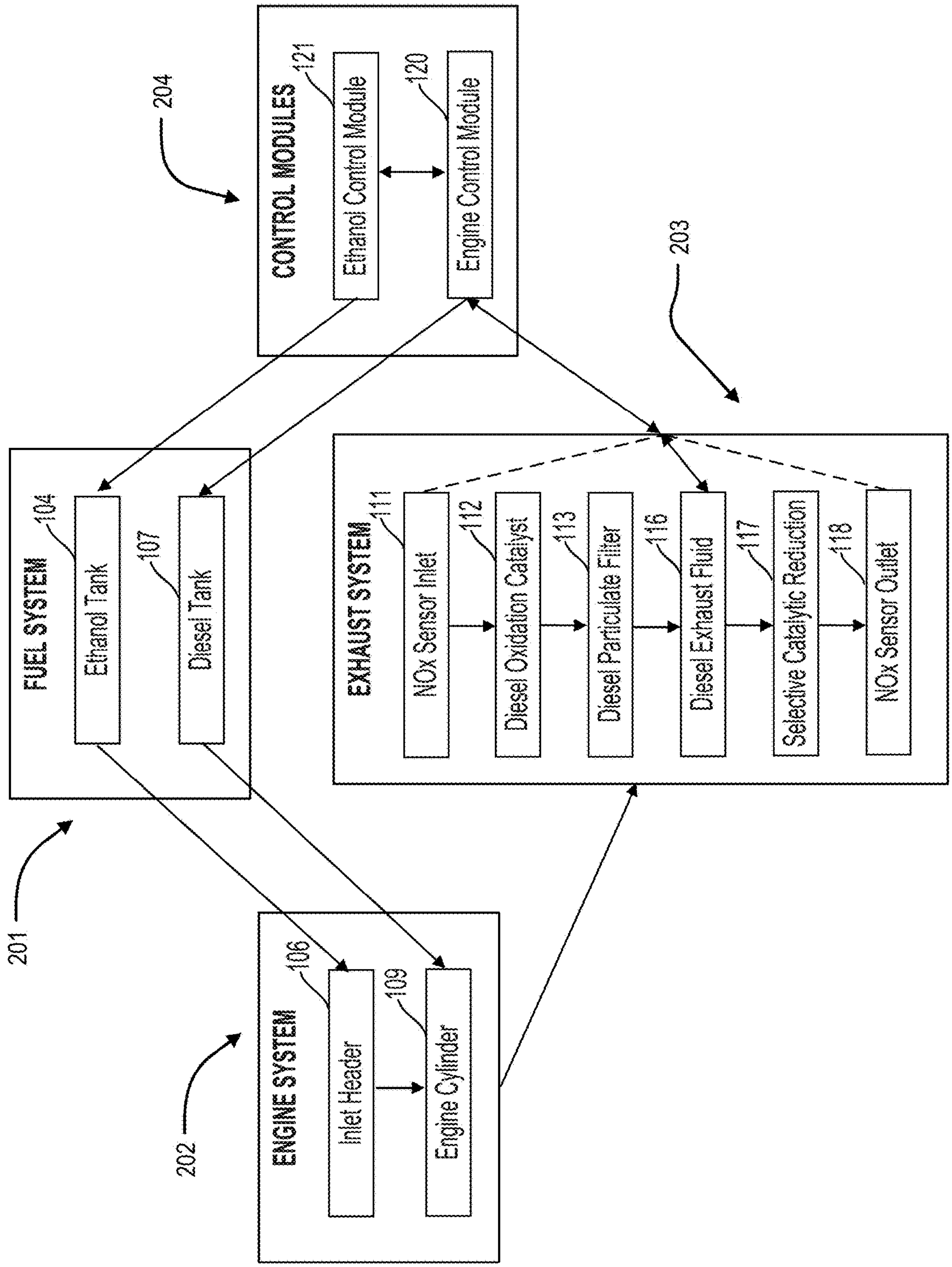
FIG. 2 is a block diagram of the different components of the engine system of FIG. 1.

With continued reference to FIG. 2, the system of the present disclosure is disclosed herein. The system may include fuel system 201, engine system 202, exhaust system 203, and control modules 204. When the ethanol and diesel are separately stored in the ethanol tank 104 and diesel tank 107, respectively, the rate of delivery of the fuel to engine cylinders 109 of engine system 202 may be modulated, at least in part, by ethanol control module 121 and engine control module 120. The ethanol is routed from ethanol tank 104 to engine inlet header 106, blended with diesel that is present in engine cylinders 109, and combusted. The generated exhaust/emission gas is routed to exhaust system 203, where NOx in the exhaust gas is converted to $N_2$ and $H_2O$.

When the exhaust gas enters exhaust system 203, NOx level in the exhaust gas is measured at NOx sensor inlet 111 before undergoing subsequent treatment. After undergoing treatments at diesel oxidation catalyst 112, diesel particulate filter 113, diesel exhaust fluid stream 116, and selective catalytic reduction 117, the NOx level in the treated exhaust gas is measured at NOx sensor outlet 118. The NOx levels measured at NOx sensor inlet 111 and NOx sensor outlet 118 are communicated to engine control module 120. Depending on the NOx level in exhaust system 203, engine control module 120 communicates with DEF pump 115 to adjust the flow of diesel exhaust fluid stream 116 accordingly.

Additionally, in some embodiments, engine control module 120 communicates with ethanol control module 121 to control the flow of ethanol from ethanol tank 104 to engine system 202, where it is blended with diesel fuel. In some embodiments, ethanol control module 121 may signal ethanol pump 105 to increase the flow of ethanol to increase the ethanol component in the fuel blend when the NOx level in exhaust system 203 is above a threshold limit. In parallel, the engine control module 120 may also send a signal to the diesel pump 108 to control the amount and rate of flow of diesel to engine cylinders 109. In various embodiments, the engine control module 120 may signal the diesel tank 107 to reduce the flow of diesel into engine system 202 when the NOx level in exhaust system 203 is over the required limit.

In various embodiments, engine control module 120 and ethanol control module 121 may include a machine-readable medium to perform, control, monitor, or cause any of the steps of the present method. In an example, the term "machine readable medium" can include a single medium or multiple media (e.g., a single or multiple memory devices) configured to store one or more instructions (e.g., firmware, programmable logic, etc.). Accordingly, the term "machine readable medium" can include any medium that is capable of storing, encoding, or carrying instructions for execution by a machine, and that causes the machine to perform any one or more of the techniques of the present disclosure, or that is capable of storing, encoding or carrying data structures used by or associated with such instructions. Non-limiting machine-readable medium examples can include solid-state memories, non-volatile memory such as semiconductor memory devices (e.g., Electrically Programmable Read-Only Memory (EPROM), Electrically Erasable Programmable Read-Only Memory (EEPROM)) and flash memory devices; and other forms of embedded, programmable, or configurable circuitry.

Figure 3:
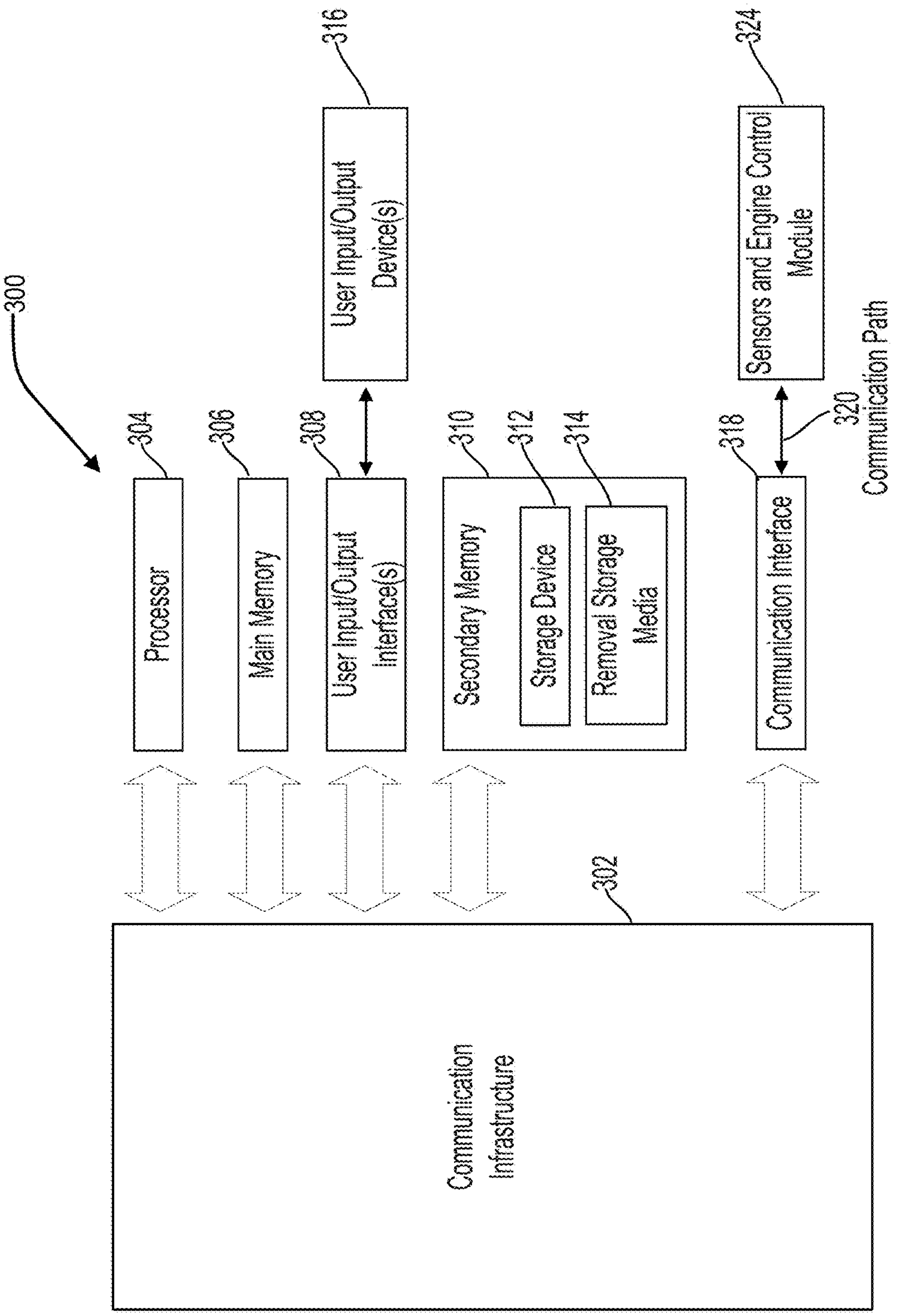
FIG. 3 is a block diagram of a control module of the engine system of FIG. 1.

Referring now to FIG. 3, the elements of an example ethanol control module (EtCM) 300 are described herein. EtCM system can be any computer-type system capable of performing the functions described in this document. EtCM 300 may include one or more processors (also called central processing units, or CPUs), such as a processor 304. Processor 304 is connected to a communication infrastructure 302. EtCM 300 may include a main or primary memory 306, such as random-access memory (RAM). EtCM 300 may also include user input/output device(s) 316 that communicates with communication infrastructure 302 through user input/output interface(s) 308 to provide specific instructions relating to the engine's operation.

EtCM 300 may also include one or more secondary memory devices 310. Secondary memory devices 310 may include, for example, a hard disk drive 312 and/or a removable storage drive 314. Removable storage drive 314 may be an external hard drive, a universal serial bus (USB) drive, a memory card such as a compact flash card or secure digital memory, a compact disc drive, an optical storage device, a tape backup device, and/or any other storage device/drive. In various embodiments, the hard disk drive 312 or removable storage drive 314 may store engine data such as NOx emission, fuel flow, DEF stream flow, engine temperature, and pressure.

EtCM 300 may further include communication interface 318. Communication interface 318 enables EtCM 300 to communicate and interact with any combination of engine sensors, including NOx sensor, temperature sensor, pressure sensor, fuel sensor, etc. (individually and collectively referenced by reference number 324). For example, communication interface 318 may allow EtCM 300 to communicate with other devices in a vehicle over communications path 320, which may consist of processing circuitry. Any engine or vehicle data may be transmitted to and from EtCM 300 via communication path 320.

Figure 4:
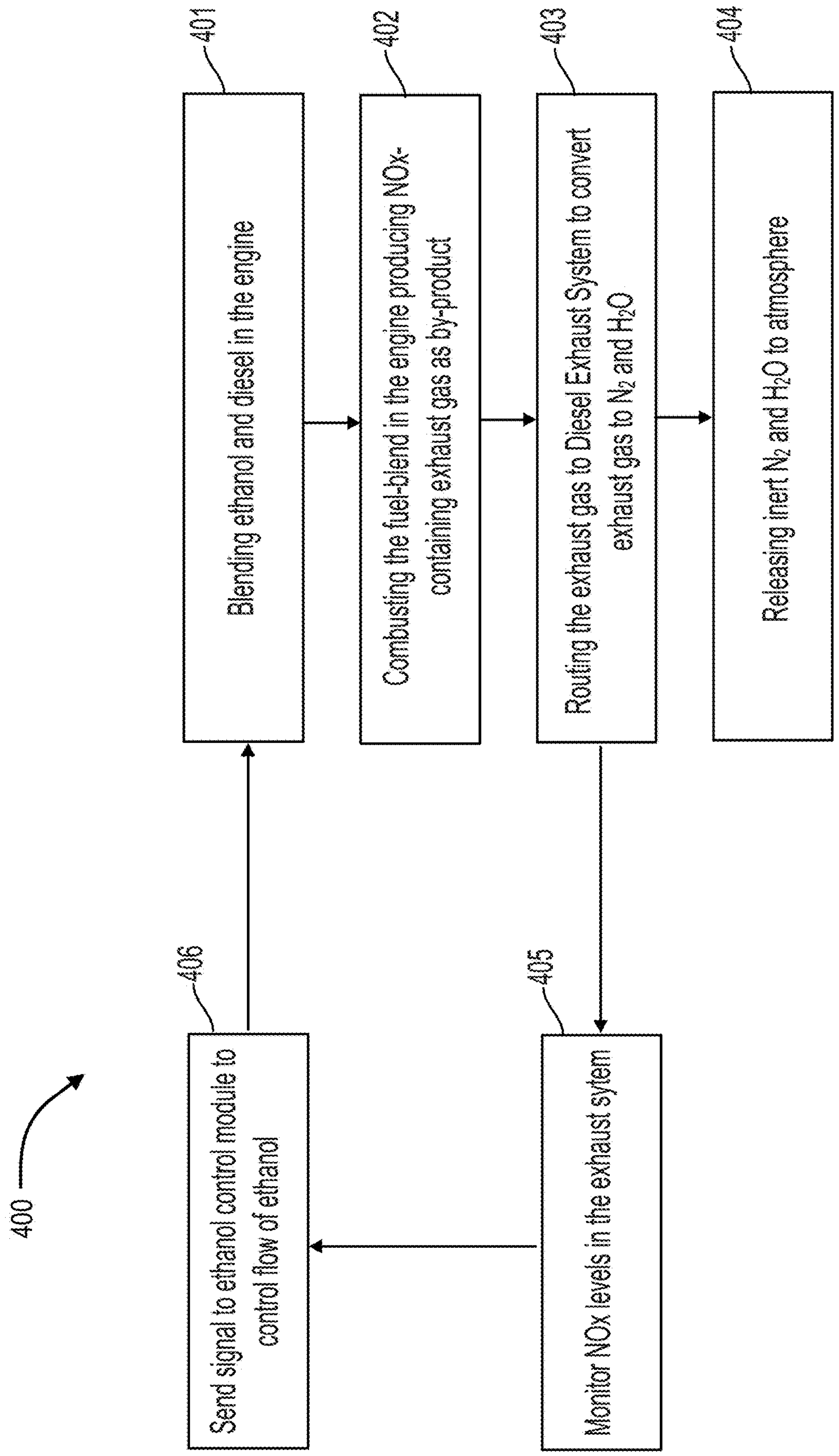
FIG. 4 is a flow chart providing a protocol for reducing NOx emissions in a diesel engine according to the present disclosure.

Referring now to FIG. 4, illustrative method 400 for reducing NOx production in diesel an engine by fuel blending of ethanol and diesel is disclosed herein. Operation 401 of method 400 may include blending ethanol and diesel in the engine prior to combustion. Operation 402 may include injecting the ethanol and diesel mixture into the engine cylinder to drive the combustion reaction, producing NOx-containing exhaust gas. Operation 403 may include routing the exhaust gas to a diesel exhaust system comprising a diesel oxidizing catalyst, a diesel particular filter, and selective catalytic reduction to convert exhaust gas to inert $N_2$ and $H_2O$. The converted and inert $N_2$ and $H_2O$ gases are released into the atmosphere in operation 404. In various embodiments, during operation 403, the NOx level in the exhaust system is monitored by NOx sensors in operation 405. Depending on the NOx level in the exhaust system, the NOx sensor may send signals to the ethanol control module to control the flow of ethanol that is to be blended with standard diesel in the engine. Operation 406 may be performed using an ethanol control module that communicates with an engine control module, the NOx sensors, and a fuel management device to control the flow of ethanol from the ethanol storage and into the engine for diesel-ethanol fuel blending.

In various embodiments, low-proof ethanol having an ethanol concentration from about 140 proof and 190 proof, about 140 proof to about 150 proof, about 150 proof to about 160 proof, about 160 proof to about 170 proof, about 170 proof to about 180 proof, or about 180 proof to about 190 proof, may be injected into the engine cylinder and blended with diesel. In various embodiments, the ethanol may be blended with diesel to achieve total % v/v ethanol in a range from about 5% v/v to about 85% v/v, about 5% v/v to about 15% v/v, about 15% v/v to about 25% v/v, about 25% v/v to about 35% v/v, about 35% v/v to about 45% v/v, about 45% v/v to about 55% v/v, about 55% v/v to about 65% v/v, about 65% v/v to about 75% v/v, about 75% v/v to about 85% v/v, about 10% v/v to about 80% v/v, about 15% v/v to about 75% v/v, about 20% v/v to about 70% v/v, about 25% v/v to about 65% v/v, about 30% v/v to about 60% v/v, about 35% v/v to about 55% v/v, about 30% v/v to about 50% v/v, or about 35% v/v to about 45% v/v of the diesel-ethanol fuel blend. Nonlimiting examples of ethanol in diesel-ethanol fuel blend may include about 5% v/v, about 10% v/v, about 15% v/v, about 20% v/v, about 25% v/v, about 30% v/v, about 35% v/v, about 40% v/v, about 45% v/v, about 50% v/v, about 55% v/v, about 60% v/v, about 65% v/v, about 70% v/v, about 75% v/v, about 80% v/v, about 85% v/v, or any range between the aforementioned values. The blended fuel mixture is then combusted in engine cylinders, where it is exposed to the compressed oxygen and nitrogen containing gas, i.e., atmospheric air. In some embodiments, the atmospheric air is routed through a turbocharger and an air cooler to compress and cool the air prior to routing to the engine cylinder.

In the engine cylinder, the diesel-ethanol fuel mixture undergoes a combustion reaction in the presence of compressed air. The combustion reaction releases heat or thermal energy, which is converted to kinetic energy, which is used to operate the engine system. The combustion of the fuel mixture in the engine releases harmful exhaust gas comprising NOx, carbon monoxide (CO), carbon dioxide ($CO_2$), and hydrocarbons. As used herein, the particulate matters include tiny solid or liquid particles suspended in the exhaust gas, comprising carbon particles, sulfur-based particles (e.g., sulfates), traces of metallic ash, soot, and unburned or partially burned hydrocarbons. As the present method utilizes a mixture of ethanol and diesel compared to diesel-only in conventional combustion, the amount of NOx produced from the present method is significantly lower. In various embodiments, the present method may achieve about 95%, about 90%, about 85%, about 80%, about 75%, about 70%, about 65%, about 60%, about 55%, about 50%, about 55%, about 50%, about 45%, about 40%, or about 35% reduction in NOx production compared to a method that lacks fuel blending.

The exhaust gas is then routed through the exhaust system configured to treat the NOx-containing exhaust gas to environmentally inert nitrogen gas and water. In various embodiments, the exhaust gas is first routed to the DOC to partially convert the exhaust gas to $CO_2$ and $H_2O$. The remaining exhaust gas is then routed to DPF, where solid and liquid particulates suspended in the exhaust gas are captured and separated from the exhaust gas and routed to SCR. In various embodiments, the particulates may comprise carbon-based particles, sulfur-based particles (e.g., sulfates), traces of metallic ash, soot, and unburned or partially burned hydrocarbons.

In various embodiments, the DEF is vaporized and decomposed into $NH_3$ and $H_2O$. In various embodiments, the vaporization of DEF is achieved at a temperature range from about 100° C. and about 140° C. The vaporized DEF stream is exposed to the exhaust gas exiting the DPF, where the NOx in the exhaust gas reacts with the $NH_3$ in the vaporized DEF in presence of a catalyst to drive the SCR to produce inert $N_2$ and $H_2O$, which is released to the environment. In various embodiments, the catalyst to drive the SCR includes a metallic catalyst selected from the group consisting of titanium, vanadium, tungsten, platinum, palladium, rhodium, or a combination thereof. In the conventional diesel engine system, the engine control module (ECM) controls the flow of input diesel into the engine cylinders, monitors NOx levels, and controls the flow of DEF in the exhaust system.

In various embodiments, a second control module, i.e., an ethanol control module (EtCM), controls the ethanol flow into the fuel blending system to replace some of the diesel in the fuel system with low-proof ethanol, thereby reducing the amount of NOx generated from the combustion of the fuel mixture. The present system does not require any additional modification to the engine system and can be readily installed on any pre-existing diesel engine systems and vehicles. In various embodiments, the EtCM is coupled to the pre-existing ECM, receives feedback signals from ECM based on NOx emissions, engine loading, engine temperature, and pressure, and adjusts the ethanol flow accordingly. For instance, after generation of NOx through the combustion of the diesel-ethanol fuel blend, NOx emission level is monitored at a NOx sensor inlet, which measures the total NOx generated from the combustion of the fuel mixture in the engine before being routed to the exhaust system. In various embodiments, depending on the level of NOx emission detected at the NOx sensor inlet, the amount and flow of ethanol from the ethanol tank into the engine is controlled.

In various embodiments, when the NOx level is above the required limit at the NOx sensor inlet, i.e., above a threshold level, at about 200 ppm, about 190 ppm, about 180 ppm, or about 160 ppm, the ECM will send a signal to the EtCM to increase the flow of ethanol by the ethanol pump to be blended with diesel. Similarly, when the NOx level is above the threshold level at the NOx sensor inlet, the ECM will send a signal to the DEF pump to increase the flow of the vaporized DEF stream to counter the high level of NOx generated from the combustion in the engine. Additionally, in some embodiments, when the NOx level is low at the NOx sensor inlet, i.e., below the threshold level, the ECM sends a signal to the EtCM to decrease or stop the flow of ethanol to be blended with the diesel. In various embodiments, when the NOx level is below the threshold level at the NOx sensor inlet, the ECM sends a signal to the DEF pump to reduce or stop the flow of the vaporized DEF stream, thereby reducing the amount of post-combustion processing required.

In various embodiments, the NOx level is also monitored at a NOx sensor outlet, which measures the amount of NOx in the exhaust gas after exposure to the vaporized DEF stream and the SCR of NOx. In various embodiments, when the NOx level in the treated exhausted gas is high, i.e., above a threshold level, at about 200 ppm, about 190 ppm, about 180 ppm, or about 160 ppm, the ECM will send a signal to both DEF pump and the EtCM to increase the flow of ethanol and DEF, respectively. Conversely, when the detected NOx level in the treated exhausted gas is low, i.e., below a threshold level, the ECM will send a signal to the DEF pump and the EtCM to decrease or stop the flow of ethanol and DEF, respectively. In various embodiments, any variation in the NOx level caused by the ethanol fuel will automatically cause adjustments in the ECM. These adjustments will reduce the diesel flow to the engine and reduce or eliminate the need for diesel exhaust fluid (DEF). Furthermore, if low-proof ethanol is not available, the ECM will automatically bias the diesel flow to the engine and the DEF flow to drive SCR, thereby maintaining the reduced generation and emission of NOx.

Any or all of the operations of the disclosed system and method may be used onboard a vehicle (e.g., cars, trucks, recreational vehicles, construction equipment, snowmobiles, boats, ships, etc.). The disclosed method may also be used in other vehicles and devices having an engine system that produces NOx or other emissions, such as mobile power generators.

EXAMPLE

The present invention is next described by means of the following example. The use of these and other examples anywhere in the specification is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification and can be made without departing from its spirit and scope. The invention is therefore to be limited only by the terms of the claims, along with the full scope of equivalents to which the claims are entitled.

Figure 5:
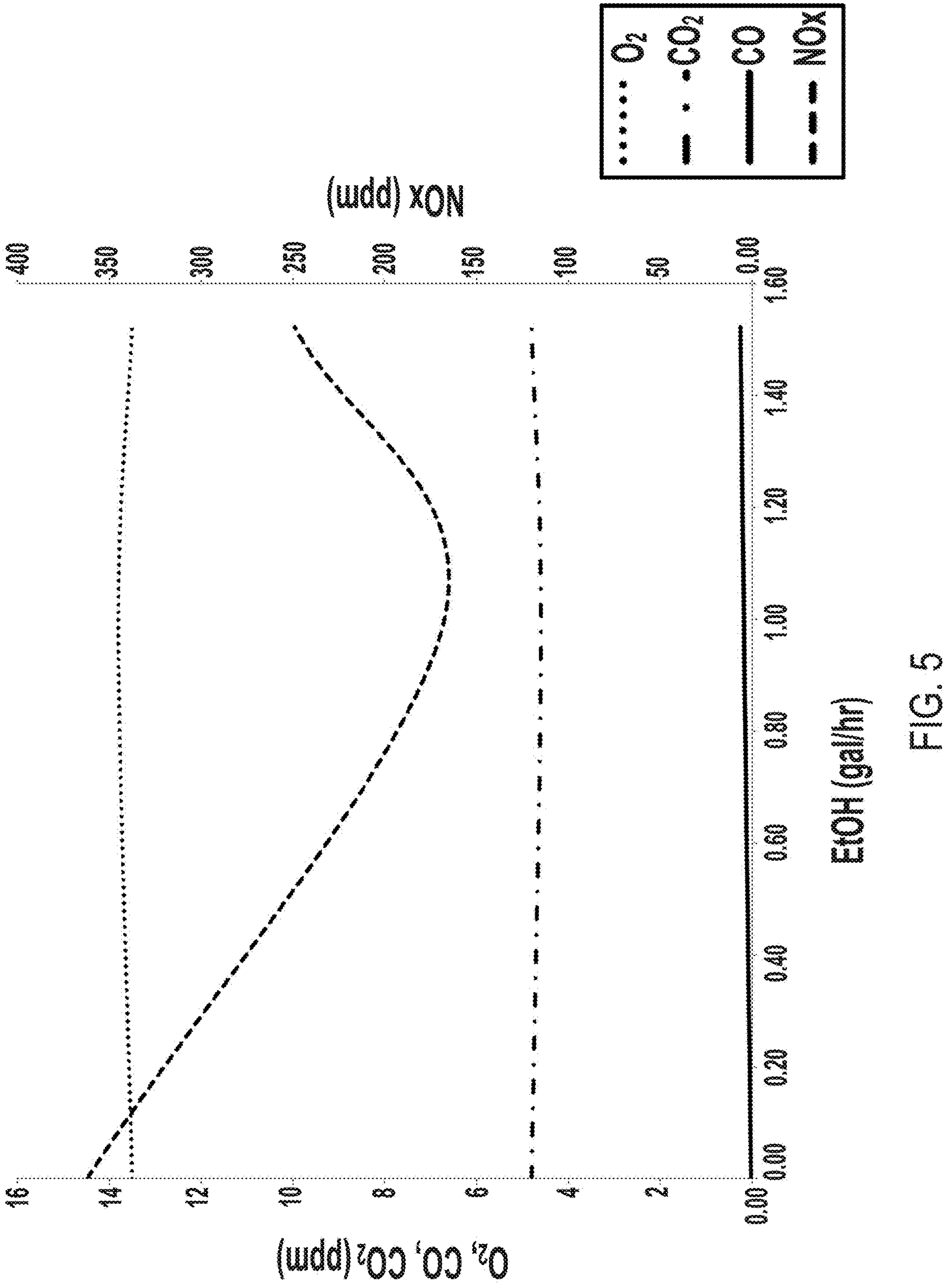
FIG. 5 is a graph showing emission gases generated as a function of ethanol amount.

Example 1: Comparison of the NOx Emission Generated from Fuel-Blending of Ethanol and Diesel This example relates to the production of emission gases, including 02, $CO_2$, CO, and NOx, as a function of ethanol level in the ethanol-diesel fuel blend ratio. In a standard diesel engine, 150 proof ethanol (75% v/v ethanol and 25% v/v $H_2O$) and standard diesel fuel were routed from separate tanks, combusted, and the emission gases monitored with as the function of % ethanol in the fuel blend. As shown in FIG. 5 and Table 1, as the % of ethanol in the fuel blend increased from 0% v/v to about 50% v/v, the amount of NOx generated from the combustion of the fuel blend decreased from approximately 370 parts per million (ppm) to 160 ppm, achieving about 57% reduction in NOx generation. When the % ethanol in the fuel blend increased above 50% v/v, the NOx emission increased slightly but remained below the starting level (maintaining about 33% reduction). After incorporating exhaust gas recirculation (EGR) to the current system, the NOx decreased even further from approximately 370 ppm to ~75 ppm, achieving almost 80% reduction in NOx.

TABLE 1

NOx emission generation in various diesel-ethanol fuel blend ratios

| Ethanol Flow (gal/hr) | Average Diesel Flow (gal/hr) | Average Total Fuel Flow (gal/hr) | % v/v Ethanol in Fuel Blend | NOx Emission (PPM) |
|---|---|---|---|---|
| 0.00 | 1.90 | 1.90 | 0 | 370 |
| 0.20 | 1.75 | 1.95 | 10.25 | 325 |
| 0.40 | 1.60 | 2.00 | 20.00 | 275 |
| 0.60 | 1.50 | 2.10 | 28.57 | 230 |
| 0.80 | 1.35 | 2.15 | 37.20 | 190 |
| 1.00 | 1.20 | 2.20 | 45.46 | 165 |
| 1.10 | 1.15 | 2.25 | 48.89 | 160 |

TABLE 1-continued

NOx emission generation in various diesel-ethanol fuel blend ratios

| Ethanol Flow (gal/hr) | Average Diesel Flow (gal/hr) | Average Total Fuel Flow (gal/hr) | % v/v Ethanol in Fuel Blend | NOx Emission (PPM) |
|---|---|---|---|---|
| 1.20 | 1.10 | 2.30 | 52.17 | 175 |
| 1.40 | 0.95 | 2.35 | 59.57 | 225 |
| 1.50 | 0.90 | 2.40 | 62.50 | 250 |

Figure 6:
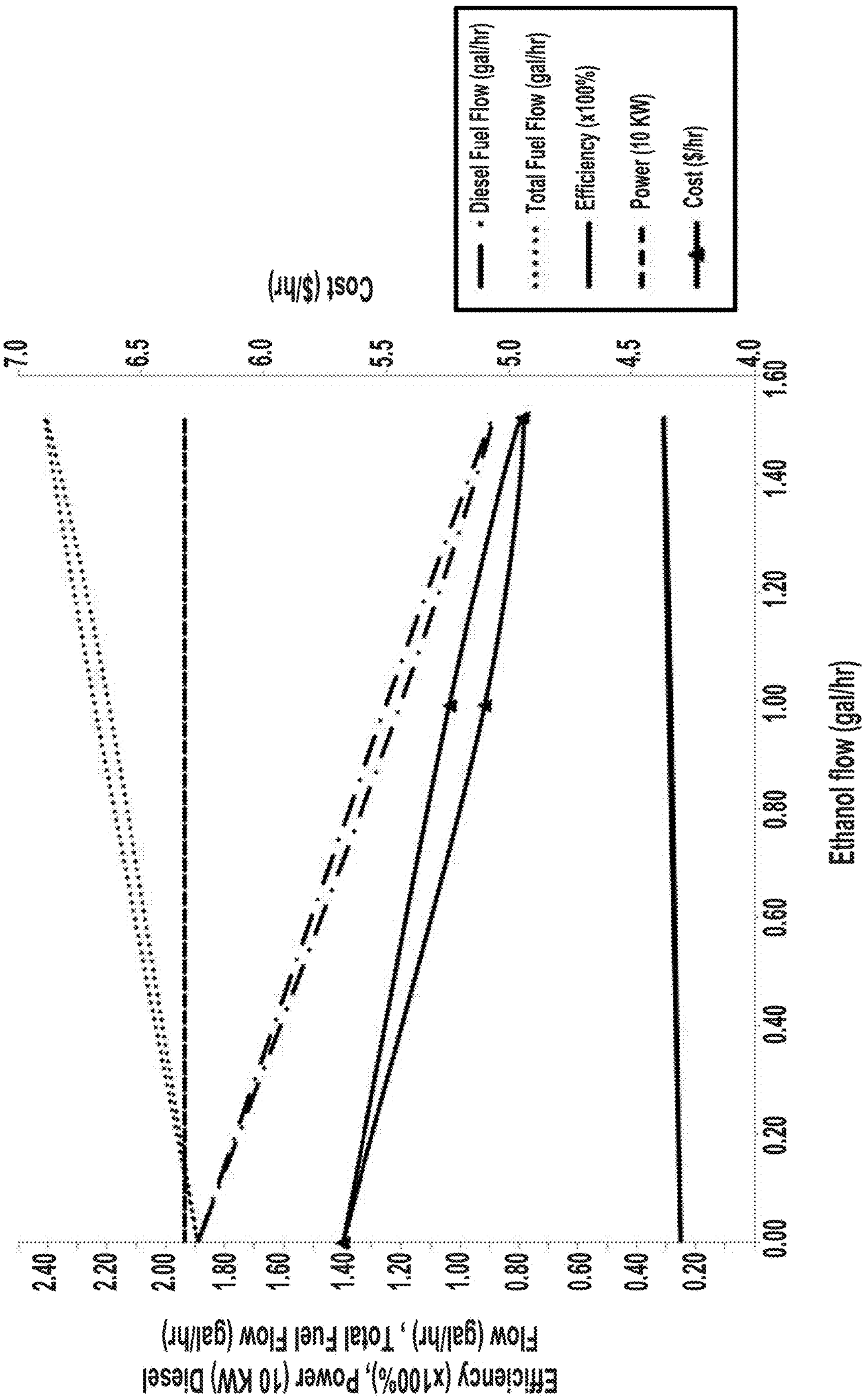
FIG. 6 is a graph showing fuel consumption, efficiency, and cost of the diesel engine as a function of fuel blend flow.

Example 2: Comparison of Engine Efficiency, Power Generation, and Cost Between the Diesel-Only System and the Diesel-Ethanol Fuel Blend System This example relates to engine performance, as measured by engine efficiency, power generation, and the cost required to operate the engine. As shown in FIG. 6, the average diesel-ethanol blend/total fuel flow (measured in both forward and reverse directions), comprising increasing ethanol flow from 0 gallons per hour (gal/hr) to 1.50 gal/hr (X-axis), and simultaneously decreasing average diesel flow (measured in both forward and reverse directions) from 1.90 gal/hr to 0.9 gal/hr resulted in the engine power remaining constant at around 190 kW, indicating no loss of engine power was observed. Additionally, the engine efficiency, which measures how effectively the engine converts the energy stored in the fuel into mechanical work, increased from 0.22 (i.e., 22%) to about 0.30 (i.e., 30%) with increasing ethanol concentration in the fuel blend. Furthermore, increasing ethanol concentration in the fuel blend resulted in the reduction of the average total operating cost ($/hr) by more than 12% from $5.6/hr to $4.9/hr.

Conclusions: Overall, the disclosed system achieved over 50% reduction in the production of NOx in the diesel engine without any additional modifications or exhaust gas recirculation (EGR) while maintaining the engine performance, e.g., efficiency and power. The disclosed system also exhibited lower operating costs as over half of the fuel content can be replaced by cheaper, low-proof (150 proof) ethanol.

The foregoing merely illustrates the principles of the disclosure. Any examples set forth in this specification are not intended to be limiting and merely set forth some of the many possible embodiments for the appended claims. Those skilled in the art will readily recognize various modifications and changes that may be made without following the example embodiments and applications illustrated and described herein, and without departing from the true spirit and scope of the following claims.

All references cited and/or discussed in this specification are incorporated herein by reference in their entireties and to the same extent as if each reference was individually incorporated by reference.

What is claimed is:

1. A system for controlling nitrogen oxide (NOx) production in an engine, the system comprising:

a first control module connected to a first fuel pump that is configured to route diesel from a first fuel tank into an engine cylinder;

a second control module connected to a second fuel pump that is configured to route ethanol from a second fuel tank into the engine cylinder producing a mixture comprising the diesel and ethanol in the engine cylinder; and wherein the first control module is coupled to the second control module and, wherein the ethanol has a concentration in a range from about 140 proof to about 190 proof.

2. The system of claim 1, wherein the mixture comprises total ethanol content of about 5% v/v to about 85% v/v, based on the total volume of the mixture.

3. The system of claim 1, further comprising an exhaust system, wherein the exhaust system further comprises a diesel exhaust fluid (DEF) pump, wherein the exhaust system comprises a first NOx sensor positioned at an outlet of the engine cylinder, a diesel exhaust fluid (DEF) pump positioned downstream of the first NOx sensor, and a second NOx sensor positioned downstream of the DEF pump;

when the system is operating, the mixture combusts in the engine cylinder to produce exhaust gas comprising NOx, and the exhaust gas routes from the engine cylinder through the exhaust system, wherein the DEF pump provides a vaporized DEF stream to the exhaust gas.

4. The system of claim 3, wherein:

the first NOx sensor measures a NOx level in the exhaust gas prior to exposure to the vaporized DEF stream; and wherein the second NOx sensor measures the NOx level in the exhaust gas after the exposure to the vaporized DEF stream.

5. The system of claim 3, wherein the first control module is connected to the DEF pump, and wherein the first NOx sensor and the second NOx sensor communicate with the first control module to modulate flow of the vaporized DEF stream.

6. The system of claim 5, wherein the flow of the vaporized DEF stream is increased at a NOx level above a threshold NOx level and decreased at a NOx level below the threshold NOx level.

7. The system of claim 3, wherein the first NOx sensor and the second NOx sensor communicate with the first control module to modulate flow of the diesel into the engine cylinder.

8. The system of claim 7, wherein the flow of the diesel is decreased at a NOx level above a threshold NOx level and increased at a NOx level below the threshold NOx level.

9. The system of claim 3, wherein the first control module is further connected to the DEF pump, and the second control module sends data to the first control module to adjust diesel flow to the engine cylinder and vaporized DEF stream flow to the exhaust system when the ethanol is not available.

10. The system of claim 1, wherein the first control module sends data received from the first NOx sensor and the second NOx sensor to the second control module to adjust flow of the ethanol into the engine cylinder.

11. The system of claim 10, wherein the flow of the ethanol is increased at a NOx level above a threshold NOx level and decreased at a NOx level below the threshold NOx level.

12. A vehicle comprising the system of claim 1.

* * * * *